Patented May 15, 1945

2,376,239

UNITED STATES PATENT OFFICE 2,376,239

RECOVERY OF OLEFINS

Theodore W. Evans, Oakland, Billee O. Blackburn, Kensington Park District, and James R. Scheibli, Oakland, Calif., assignors to Shell Development Company, San Francisco, Calif., a corporation of Delaware No Drawing. Application April 18, 1942,
Serial No. 439,552

7 Claims. (Cl. 260—577)

This invention relates to the separation of olefinic hydrocarbons from hydrocarbon mixtures containing olefinic hydrocarbons and saturated hydrocarbons. More particularly, the invention provides a practical and economical method for effecting the separation and/or recovery of olefins from paraffinic hydrocarbons containing the same number of carbon atoms.

The process of the invention comprises contacting a hydrocarbon mixture containing an olefinic hydrocarbon and a saturated hydrocarbon with an anhydrous solution of a cuprous salt under such conditions that a substantial amount of the olefinic hydrocarbon is selectively dissolved, separating the anhydrous solution of the olefinic hydrocarbon from the residual hydrocarbon or hydrocarbons and recovering the dissolved olefinic compound from the anhydrous solution.

The mixture to which the process is applied may consist only of a single olefin and one or a plurality of saturated hydrocarbons, or it may include a plurality of olefins and one or a plurality of saturated hydrocarbons. Thus ethylene may be separated from ethane, propylene from propane, butylenes and/or butadiene from butanes, pentadienes, such as isoprene, and/or amylenes, such as pentene, from pentanes, cyclopentadiene and/or cyclopentene from cyclopentanes and/or pentanes, and the like. The terms "olefinic" and "olefin" as used herein and in the appended claims are intended to embrace the open-chain and cyclic diolefins as well as the open-chain and cyclic mono-olefins.

It is known that olefins react with cuprous salts in aqueous solution to give easily decomposable addition compounds, while paraffins do not, and the reaction has been applied to separate olefins from paraffins. Aqueous solutions of cuprous chloride have been most used for this purpose. The known processes involving the reaction require the use of hydrochloric acid or ammonia to bring the cuprous chloride into solution, cuprous chloride being almost completely insoluble in water alone. If such a solutizing agent for the cuprous chloride is not used, very little of the olefin will be absorbed (only one volume of ethylene is dissolved per volume of aqueous cuprous chloride suspension). The use of ammonia or hydrochloric acid, however, has not proven satisfactory for several reasons. For example, when ammonia is employed as the solutizing agent, special procedures and equipment are necessary to recover the ammonia evolved during desorption of the olefin and to later restore it to the lean solution, while acid solutions, on the other hand, lead to corrosion of equipment, particularly in large scale operation.

It has now been found that the separation of olefinic hydrocarbons from saturated hydrocarbons, and particularly the separation of olefins from paraffin hydrocarbons containing the same number of carbon atoms, can be efficiently and economically effected by means of an anhydrous solution of a cuprous salt. The use of an anhydrous solution of the cuprous salt completely avoids the difficulties incident to the use of aqueous solutions of cuprous salts and is generally superior as will hereinafter be made clear.

The anhydrous cuprous salt solution is prepared by dissolving a cuprous salt, for example, a cuprous halide, preferably cuprous chloride, in a solvent consisting of a monohydric and/or a polyhydric alcohol and a nitrogen base. By the term "nitrogen base" is meant a nitrogen-containing organic compound which is basic in action. A most suitable class of nitrogen bases for use in preparing the solvent in which the cuprous salt is dissolved is the hydroxy-alkyl amines (alkylolamines). However, other nitrogen-containing organic compounds which are basic in action, such as diaminoiso-propanol, ethylene diamine, the related triamine, etc., may be employed, but are in general less satisfactory because the solutions prepared therewith tend to deposit metallic copper. Somewhat better results may be achieved with the more simple amines, namely, methylamine, ethylamine, and their homologues. To promote continued reactivity and clarity on the part of the solution, a relatively small quantity of a suitable reducing or stabilizing agent such as hydroxylamine hydrochloride, sulfite, stannichloride, formate, and the like, which substances act to convert any cupric salt which may be present in the solution to cuprous salt, may be added, if desired, but it is to be understood that the reducing agent or stabilizer can be entirely omitted without adversely affecting the functioning of the solution, inclusion thereof being primarily a precautionary measure.

Of the many monohydric and polyhydric alcohols suitable for preparing the anhydrous cuprous salt solution, the following may be mentioned: methanol, ethanol, normal propyl alcohol, isopropyl alcohol, normal butyl alcohol, isobutyl alcohol, secondary butyl alcohol, tertiary butyl alcohol, ethylene glycol, propylene glycol and glycerol. The term "alcohol" is used herein and in the appended claims to embrace the monohydric as well as the polyhydric alcohols. The alcohol and nitrogen base, preferably an alkylolamine which may be mono- or di-ethanolamine and/or one or more of the other members of the hydroxyalkylamine series such as the propanolamines, the butanolamines, and the like are preferably mixed in a volume ratio of 1:1. The solvent thus prepared will generally dissolve cuprous chloride to an extent exceeding 10.4% copper and the resulting solution may be repeatedly used without any appreciable lowering of its qualities provided reasonable care is exercised to protect it from contact with air.

The process of the invention may be executed with the treated hydrocarbon mixture in either the gaseous or liquid phase. Any suitable method of contacting the gaseous or liquid hydrocarbon mixture with the liquid anhydrous cuprous salt solution may be employed. When a gaseous hydrocarbon mixture is treated, a preferred procedure is to countercurrently contact the gaseous hydrocarbon mixture with the liquid solvent in a suitable column or tower provided with plates or other contact elements. The hydrocarbon mixture is preferably contacted with the liquid solvent under a superatmospheric pressure and at a temperature not substantially exceeding 20° C. The quantity of olefin absorbed is greatly increased at only slightly elevated pressures.

The absorption vessel which may be a spray, packed or bubble plate column, is preferably provided with internal or external cooling means as the absorption of olefins by the solution is exothermic. It is also advisable to have a layer of copper turnings immediately above the gas inlet whereby any oxygen present in the gas being treated is separated therefrom and corrosion problems made less likely. Where the gas mixture comprises acetylene and hydrogen sulfide, as is the case with most raw cracking gases, prior removal of these components by appropriate scrubbing or other means is recommended as they have an adverse effect upon the solution.

Desorption of the olefinic components from the fat or enriched solution can be very easily effected by heating the solution to a temperature between 40° C. and 80° C. or by releasing the pressure on the solution, or by both measures in combination. The regenerated solution may be returned to the absorption vessel in a continuous process.

The following examples are introduced for the purpose of illustrating the superiority of the solution used in the execution of the present process in terms of absorbing power, both as to quantity of olefin absorbed and rate of olefin absorption, and in terms of stability.

*Example I*

10 cc. of a solution prepared by dissolving 10 gms. of cuprous chloride in a solvent consisting of 25 cc. methanol and 25 cc. ethanolamine was charged to an absorption flask provided with a gas inlet, and the flask immersed in a 20° C. constant temperature bath. When a stream of ethylene was passed through the solution at atmospheric pressure, 90.8 cc. of the gas was immediately taken up. After desorption of the olefin, the regenerated solution was stored for two and one-half days at 60° C. in order to determine its stability. When again tested under same conditions 93.2 cc. of the gas was absorbed.

*Example II*

The absorption flask of Example I was charged with a solution made up by dissolving about 10 gms. cuprous chloride, and a small quantity of stabilizer in 30 cc. methanol and 20 cc. ethanolamine. At 20° C., the solution rapidly dissolved 93.8 cc. ethylene admitted at atmospheric pressure. Subsequently, the olefin was desorbed by mild heat (60° C.) and the regenerated solution stored for 6 days at 60° C. When tested under the same conditions at the end of this period, it dissolved 100.3 cc. of ethylene. In view of the increase in gas absorbed following the storage period, it was thought advisable to again store and test the solution. After one more day at 60° C. and two more days at 80° C., the solution under the identical conditions of the previous tests dissolved 108.1 cc. of ethylene.

*Example III*

The solution of Example II was tested at 20° C. against an aqueous ethanolamine cuprous chloride solution of the same strength. The aqueous solution required over three minutes to absorb 85.33 cc. ethylene, whereas the solution of Example II dissolved 93.8 cc. of the gas in less than two minutes.

Explanation for the increased reactivity of the solution of Example II following storage is lacking, but is thought due to the alcohol rather than the stabilizer, in view of Example I wherein no stabilizer was added to the solution and in view of the further fact that stabilized aqueous ethanolamine solutions do not exhibit this phenomenon. With respect to Example I, however, it should be noted that storage of the unstabilized solution at temperatures above 80° C. rather than at 60° C. for comparable periods had the opposite effect, the amount of ethylene the solution would thereafter dissolve being approximately halved. Care should be exercised, therefore, during repeated regeneration of the unstabilized solution by heat to maintain the temperature below 80° C.

The selectivity of the anhydrous alcoholic cuprous salt solutions for olefins is at least equal to and in most cases is superior to that of the aqueous solution of the prior art, the percentage of paraffin in the absorbed gas generally running substantially less than 5%. When the olefin is desired in the highest possible state of purity, advantage may be taken of the fact that the selectivity of the solution is enhanced by increasing the temperature. While this decreases the absolute solubility of the olefin in the solution, recovery of substantially the entire olefinic content of the treated mixture can be nevertheless effected, for example, by employing a number of absorbers in series, the unabsorbed gas in each instance being directed to enter the next adjacent absorber. Another procedure whereby advantage is taken of the increased selectivity of the solution for olefins at higher temperatures but which, at the same time, provides for substantially complete recovery of the olefinic content of the treated mixture resides in executing the present process according to the principle of extractive distillation, the anhydrous cuprous salt solution being caused to flow down the distillation column as the mixture is distilled.

While the absorbing power and stability of the anhydrous alcohol solutions of the cuprous salt used in the process of the invention has been illustrated with particular references to the recovery of ethylene, the invention is not to be considered as limited to the recovery of ethylene as it is generally applicable to the recovery of olefins from mixtures thereof with saturated hydrocarbons and is particularly suitable for the separation of olefins from paraffin hydrocarbons containing the same number of carbon atoms.

It is to be further understood that other cuprous salts may be used in place of cuprous chloride in preparing the anhydrous cuprous salt solution. For example, the solution may be prepared with cuprous iodide or bromide, or less preferably with cuprous formate or acetate. Moreover, without departing from the spirit of the invention solutions may be prepared with cupric salts which are subsequently reduced before or during use by metallic copper, hydroxylamine or other suitable agent.

The invention claimed is:

1. The process for separating ethylene from ethylene-containing gas mixtures which comprises contacting the ethylene-containing gas mixture with an anhydrous solution consisting of cuprous chloride, ethanolamine, and methanol to selectively dissolve the ethylene.

2. The process for separating ethylene from an ethane-ethylene gas mixture which comprises contacting the gas mixture with an anhydrous solution consisting of a cuprous halide, an ethanolamine, and methanol to selectively dissolve the ethylene.

3. The process for separating ethylene from an ethane-ethylene gas mixture which comprises contacting the gas mixture with an anhydrous solution consisting of a cuprous salt, an alkylolamine, and a monohydric alcohol to selectively dissolve the ethylene.

4. The process for separating ethylene from an ethane-ethylene mixture which comprises contacting the mixture with an anhydrous solution consisting of a cuprous salt in a mixture of an alcohol and a hydroxy-alkylamine to selectively dissolve the ethylene.

5. The process for separating an olefin from a hydrocarbon mixture containing an olefin and a paraffin hydrocarbon which comprises contacting the hydrocarbon mixture with a stabilized anhydrous solution consisting of cuprous chloride dissolved in a mixture of ethanolamine and methanol to selectively dissolve the olefin, and separating the residual hydrocarbons from the liquid solution of the olefin.

6. The process for separating an olefin from a hydrocarbon mixture containing an olefin and a paraffin hydrocarbon which comprises contacting the hydrocarbon mixture with an anhydrous solution consisting of a cuprous salt dissolved in a mixture of an alkylolamine and an an alcohol to selectively dissolve the olefin, and separating the residual hydrocarbons from the liquid solution of the olefin.

7. The process for separating an olefin from a hydrocarbon mixture containing an olefin and a paraffin hydrocarbon which includes contacting the hydrocarbon mixture with an anhydrous solution consisting of a cuprous salt dissolved in a mixture of a nitrogen base and an alcohol to selectively dissolve the olefin, and separating the residual hydrocarbons from the liquid solution of the olefin.

THEODORE W. EVANS.
BILLEE O. BLACKBURN.
JAMES R. SCHEIBLI.